United States Patent [19]

Stierli

[11] 4,442,148
[45] Apr. 10, 1984

[54] WATERPROOFING LAMINATE

[75] Inventor: Robert F. Stierli, Lexington, Mass.

[73] Assignee: W. R. Grace & Co., Cambridge, Mass.

[21] Appl. No.: 307,702

[22] Filed: Oct. 2, 1981

[51] Int. Cl.$^3$ .................... B32B 3/00; B32B 11/00; B32B 5/14

[52] U.S. Cl. .................... 428/40; 428/148; 428/352; 428/354; 428/489; 428/490; 428/499; 428/478.2; 428/520; 428/509; 428/510; 428/144

[58] Field of Search ............ 428/40, 352, 354, 489, 428/490, 499, 478.2, 520, 509, 510, 144

[56] References Cited

U.S. PATENT DOCUMENTS

| | | | |
|---|---|---|---|
| 3,474,625 | 10/1969 | Draper et al. | 428/489 X |
| 3,741,856 | 6/1973 | Hurst | 428/489 X |
| 4,055,453 | 10/1977 | Tajima et al. | 428/144 X |
| 4,265,967 | 5/1981 | Kumins et al. | 428/489 X |
| 4,396,665 | 8/1983 | Rowe | 428/148 |

FOREIGN PATENT DOCUMENTS

| | | | |
|---|---|---|---|
| 883663 | 6/1980 | Belgium. | |
| 2840599 | 3/1980 | Fed. Rep. of Germany | 428/489 |

*Primary Examiner*—P. Ives
*Attorney, Agent, or Firm*—John J. Wasatonic; William L. Baker

[57] ABSTRACT

An improved pre-formed, sheet-like flexible laminate suitable for waterproofing of structural surfaces, the sheet-like material having a laminate structure of (a) a flexible waterproof and waterproofing bituminous membrane and (b) a support sheet material covering at least one major surface of the bituminous membrane; an oil-impermeable polymeric coating being provided between said support sheet material and the adjacent surface of the bituminous membrane to protect the support sheet from adverse effects of oil present in the bituminous membrane.

8 Claims, 1 Drawing Figure

WATERPROOFING LAMINATE

BACKGROUND OF THE INVENTION

This invention relates to improvements to waterproofing materials which are in the form of pre-formed, sheet-like laminates of (a) a waterproof and waterproofing bituminous membrane adhered to (b) a support sheet material covering at least one major surface of the bituminous membrane.

It is known that structural surfaces and the like such as concrete decks, foundations, roofs, etc., can be sealed in a waterproof manner by forming thereon a continuous membrane of a bituminous composition which is substantially impermeable to moisture. The term "bituminous composition" as used in the present disclosure refers to compositions based on tar, asphalt or pitch with or without added components. In the past such waterproofing membranes have been formed by "in situ" application of a hot bituminous composition or of a cold solution or emulsion of bitumen, tar or pitch, typically in combination with one or more "plys" of bitumen-saturated felts. These known methods of "in situ" application of adhesive and felts suffer serious disadvantages. The procedures require the formation of a layer of waterproofing sealant at the job site which does not permit the assurance of a uniform application or of a resultant uniform layer. In addition, such application causes additional expenses of labor at the job site. Finally, application of such waterproofing to vertical substructural membranes is both tedious and in certain instances unmanageable.

More recently, waterproofing of structural surfaces has been accomplished by the application of pre-formed, flexible membranes of bituminous compositions which are pressure sensitive-adhesive such as those disclosed in U.S. Pat. Nos. 3,741,856; 3,853,682 and 3,900,102 to John Hurst. These waterproofing materials have a laminate structure comprising a sheet-like support member such as a polymer film adhered to a membrane of a flexible bituminous composition superimposed thereon. The bituminous composition may be single or multilayered and has self-adhesive properties which render it adherent to the support sheet and also to the substrate surface to which it is applied.

Generally, the known pre-formed self-adhered waterproofing structures of the foregoing type have a support sheet such as polymer film and a membrane of bituminous composition which are essentially co-extensive and, in addition, have a removable protective or release sheet positioned on the free surface of the adhesive membrane which must be removed before application of the waterproofing laminate to the structural surface. Pre-formed waterproofing laminates of each type have also been formed with the membrane of bituminous composition extending a short distance beyond the support sheet to yield a partially exposed surface. These partially exposed surfaces aid in forming watertight joints at overlaps of successively-applied laminates.

Pre-formed waterproofing laminates comprised of polymer film layers and bituminous waterproofing membranes and which are not self-adhesive to the substrate are also known. For example, a pre-manufactured membrane laminate product "KMM" described in a product brochure entitled "KMM Koppers Roofing and Waterproofing Membrane", published by Koppers Company, Inc., 1976, is a non-self adhesive, multi-layer laminate comprised of several layers of plastic film and bitumen composition which is laid upon a substrate and thereafter abutting edges of like laminates are heated to "weld" the laminates into a continuous waterproofing layer non-adherent to the substrate. Also, in U.S. Pat. No. 4,039,706 to Tajima Roofing Co. Ltd., self-adhesive strip-laminates comprised of a sheet support and self-adhesive bituminous layers are said in one embodiment to be applicable to roofs, etc., adhesive-side up. Another like laminate is then applied adhesive-side down to the upper exposed layer of adhesive of the first applied laminate resulting in a continuous waterproofing membrane layer composed over its entirety of "multi-layers" of bituminous adhesive and sheet support.

A drawback inherent in all of the aforementioned types of pre-formed waterproofing laminates is that the support sheets for the bituminous membranes often used therein can sometimes be adversely affected by oils present in the bituminous composition. For example, the dimensional stability of polyethylene film, a popular support sheet often used in such pre-manufactured waterproofing membranes, can be adversely affected when the film is contacted by oils such as aromatic oils present in the bituminous composition. A decrease in the dimensional stability of the polymer film by prolonged contact with such oils can lead to undesirable curling of the applied laminate upon exposure to elevated temperature.

SUMMARY OF THE INVENTION

The present invention is directed to a novel, flexible pre-formed waterproofing laminate of improved dimensional stability. The improved waterproofing structure comprises a pre-formed laminate structure of a waterproofing flexible bituminous membrane preferably pressure-sensitive adhesive, having substantially co-extensively superimposed on at least one major face of the membrane a flexible polymeric support sheet material. An oil-impermeable coating is positioned between the membrane and the support sheet to substantially prevent contact of the support by oils in the bituminous composition.

DESCRIPTION OF THE DRAWING

The FIGURE is a perspective view of a preferred waterproofing laminate construction according to the invention.

DETAILED DESCRIPTION OF THE INVENTION

Figure 1:
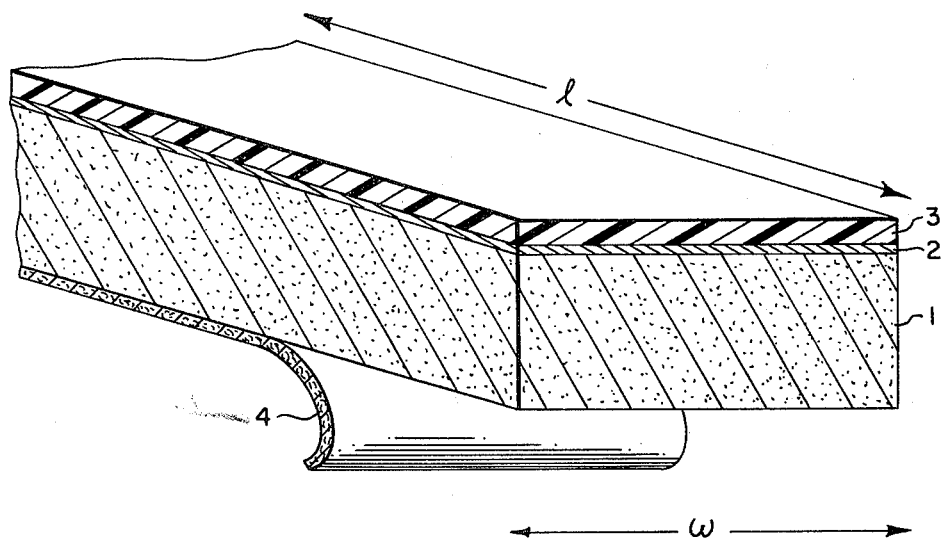

In the attached FIGURE, a flexible pre-formed waterproofing laminate strip is shown as comprised of a comparatively thick layer of normally self-adhesive oil-containing bituminous water-proofing composition 1, non-removably adhered to a comparatively thinner support sheet 3, for example a sheet of polyethylene film. To protect the polyethylene film 3 from being substantially contacted by oils present in the bituminous composition 1, a polymer coating barrier layer 2 hereinafter described is positioned between the layers 1 and 3. The polymer coating could be pre-applied to either or both of the layers 1 and 3. To protect the self-adhesive surface of the bituminous adhesive layer remote from layer 3, a removable protective sheet 4, for example a sheet of siliconized paper, is applied thereto. The sheet 4 adheres sufficiently to the bituminous adhesive to keep it in place during rolling up and handling of the laminate, but is easily removable therefrom without physical damage to the layer 1. The flexible laminate strip shown in FIG. 1 preferably has a width ("w") say of thirty six inches and a length ("l") of say sixty feet and is conveniently produced in the form of a roll for delivery to the job-site.

The self-adhesive or pressure-sensitive bituminous waterproofing layer 1 preferred for use herein is preferably of the type described in U.S. Pat. Nos. 3,741,856; 3,853,682 and 3,400,102 to John Hurst. The adhesive composition comprises a mixture of (a) a bituminous material and (b) natural or synthetic polymer preferably a rubber or other elastomer polymer. The amount of polymer employed in such compositions is typically from about 1 to 100, preferably about 20 to 50, percent by weight of the bituminous material. The term "bituminous material" as used herein includes compositions containing asphalt, tar such as coal tar, or pitch. The bituminous adhesive may be reinforced with fibers and/or particulate fillers. In addition to any oils normally present in the bitumen, the adhesive composition may also contain a conventional extender component such as mineral oil. Suitable polymer components for use in the adhesive composition include thermoplastic polymers such as polyethylene and the like. As aforementioned, the preferred polymer component is rubber which may be virgin rubber or a synthetic rubber which is blended into the bitumen and preferably extender oil at elevated temperature, to form a smooth mix. Generally, suitable adhesive compositions have softening points (measured by the Ring and Ball method) of 70° to 120° C., preferably 75° to 100° C., and penetration values of 50 to 400, preferably 50 to 100 dmm. at 25° C. (150 g/5-ASTM D217), and are thermoplastic in nature.

As mentioned in the aforementioned Hurst patents, in order to give optimum sealing and waterproofing performance the adhesive layer should be at least 0.010 inch thick and preferably in the range of about 0.025 to about 0.200 inch thick. The adhesive layer can be comprised of one or more layers of the aforementioned bituminous adhesive, not necessarily of the same composition, to give an adhesive layer within the overall aforementioned thickness range. Further, the adhesive layer can have a reinforcement such as an open weave fabric, gauze, scrim or the like located therein to strengthen it. The adhesive layer 1, at least at its surface remote from support sheet 3 is as aforementioned preferably pressure-sensitive and tacky at normal ambient temperature in order that it be self-adhesive to the substrate. The bituminous adhesive layer serves to form a continuous waterproofing layer which is elastic and self-sealing against punctures at high and low temperature.

The support film layer 3 serves as a strength imparting and supporting member in the laminate and also as a barrier to prevent moisture vapor transmission through the laminate. Thus while of less thickness than that of the bituminous waterproofing layer 1, the support layer 3 should be of sufficient thickness to impart e.g. tear and puncture resistance to the laminate. The support layer 3 suitably has a thickness in the range of from about 0.002 to about 0.025 inches, preferably from about 0.004 to about 0.010 inches.

The polymeric sheet materials used in the layer 3 are films of synthetic organic polymers, the dimensional stability of which is adversely affected by oils present in the bituminous membrane 1. Thus the layer 3 may be comprised of a polyolefin film such as polyethylene, and the film may be uniaxially oriented, biaxially-oriented or cross laminated, as is known in the art. Moreover, the support layer 3 may be rendered opaque, for example by inclusion of a pigment such as carbon black, to increase its weatherability as is also well known in the art.

The oil impermeable polymeric barrier 2 can be any known polymeric material which is capable of acting as an oil passage barrier with respect to the support sheet member 3. Polymeric materials which are suitable for this purpose include polyvinyl acetate, polyvinylidene chloride, polyacrylonitrile (cured), casein, alpha protein, zein, cellulose polymers such as hydroxypropyl methyl cellulose, as well as neoprene rubber, etc. The polymeric material may contain additives, e.g. plasticizers, to improve one or more of its properties.

The barrier 2 can be formed by depositing a coating of the polymer to the support sheet 3 or to the surface of adhesive by any known method such as spray application or by solution application. The polymer coating member should have substantially compatible tensile and adhesive properties to allow the coating to form a flexible barrier layer having the desired physical properties disclosed and described hereinabove. The thickness of the barrier coating can be of any dimension which is suitable to form an oil impermeable membrane. It is preferred that the thickness be less than half of the thickness of the support sheet 3.

As aforementioned, a sheet of paper, e.g. Kraft paper, having a coating thereon of silicon "release" composition as is well know in the art, may be used as the protective layer 4. Other sheet materials, for example plastic films having the requisite "release" properties per se or coated with "release" coatings could be used.

The following example is for illustrative purposes only and is not intended to limit the invention except as defined by the claims set forth hereinbelow. All parts and percentages are by weight except when otherwise indicated.

EXAMPLE

In an experiment, an 8 mil thick opaque cross-laminated, high density polyethylene film was coated with a solution of hydroxy methyl cellulose as a barrier coating and the coating thereafter dried. To improve the flexibility of the resulting cellulose film and its adhesion to the polyethylene film, to the coating composition was previously added a small amount of an oil-resistant plasticizer, RESOFLEX$^{(R)}$296, a proprietary product of Cambridge Industries Co., described in the literature as a resinous, non-volatile, non-migrating plasticizer having excellent resistance to oil, fats, etc., and excellent flexibility and toughness. The barrier coated surface of the polyethylene film was in turn coated with a 60 mil thick bituminous water-proofing composition having self-adhesive or pressure-sensitive adhesive properties. The adhesive composition was a blend containing approximately 46 parts asphalt, 16 parts styrene-butadiene rubber, 9 parts filler, 27 parts aromatic petroleum oil as well as minor additional additives. The resulting laminate sample was tested in a manner described below.

For comparison purposes, a "control" laminate sample was prepared as above, except that no barrier coating was applied to the polyethylene film previous to the application of the bituminous adhesive. The two laminates were than tested for dimensional stability after exposure to elevated temperature by placing the samples in an oven heated to 160° F. Within two weeks, the laminate containing no barrier coating was 95 percent curled, while the barrier coated sample essentially retained its dimensional stability for the duration of the test (approximately 26 days). The test established that an oil-barrier coating would have a significant effect upon the dimensional stability of the film.

While the invention has been described in connection with one of the preferred embodiments, it is not intended to limit the invention to a particular set form, but, on the contrary, it is intended to cover such alternatives, modifications and equivalents as may be included within the spirit and scope of the invention as defined by the appended claims.

It is claimed:

1. An improved pre-formed, sheet-like flexible laminate for waterproofing structural surfaces, said laminate being comprised of (a) a flexible waterproof and waterproofing bituminous membrane having oil therein; (b) a flexible non oil-resistant polymeric support sheet for said membrane non-removably adhered thereto and covering at least one major surface of said membrane; and (c) intermediate said bituminous membrane and said support sheet, an oil resistant and oil-impermeable barrier formed by depositing a coating of an oil-resistant polymer to said sheet and/or said membrane, whereby oil present in said bituminous membrane is prevented from substantially contacting said polymeric sheet.

2. A laminate as in claim 1 wherein said polymeric sheet is comprised of a polyolefin.

3. A laminate as in claim 2 wherein said polyolefin is polyethylene.

4. A laminate as in claim 1 wherein said bituminous membrane is formed from a mixture comprising asphalt, elastomer, and oil having pressure sensitive adhesive properties.

5. A laminate as in claim 4 wherein a removable protective sheet is provided on the surface of said bituminous membrane remote from the polymeric support.

6. A laminate as in claim 1 wherein said oil-resistant polymer is polyvinyl acetate, polyvinylidene chloride, polyacrylonitrile, casein, alpha protein, zein, a cellulose polymer or neoprene rubber.

7. A laminate as in claim 1 wherein said oil-resistant polymer is hydroxy methylcellulose.

8. A laminate as in claim 7 wherein an oil-resistant plasticizer is added to said hydroxy methylcellulose before depositing said coating.

* * * * *